(12) United States Patent
Hoffman

(10) Patent No.: US 11,140,016 B1
(45) Date of Patent: Oct. 5, 2021

(54) METHOD AND INSTRUMENT FOR OFDM LEAKAGE DETECTION VIA CORRELATION OF OFDM PILOT SPECTRAL LINES

(71) Applicant: VIAVI SOLUTIONS INC., San Jose, CA (US)

(72) Inventor: Brent Hoffman, Mooresville, IN (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/901,599

(22) Filed: Jun. 15, 2020

(51) Int. Cl.
*H04L 27/26* (2006.01)
*H04W 16/14* (2009.01)
*H04L 5/00* (2006.01)
*G06F 17/14* (2006.01)

(52) U.S. Cl.
CPC .......... *H04L 27/2675* (2013.01); *G06F 17/14* (2013.01); *H04L 5/0007* (2013.01); *H04L 27/2657* (2013.01); *H04L 27/2678* (2013.01); *H04W 16/14* (2013.01)

(58) Field of Classification Search
CPC ........... H04B 3/46; H04B 3/542; H04L 43/50; H04L 12/2801; H04L 5/0007; H04L 25/0226; H04L 27/2601; H04L 27/2663; H04L 25/08; H04L 27/2675; H04L 27/2657; H04L 27/2678; H04W 16/14
See application file for complete search history.

(56) References Cited

U.S. PATENT DOCUMENTS

2016/0087742 A1\* 3/2016 Zinevich ............ H04N 21/4382
370/203

\* cited by examiner

*Primary Examiner* — Rahel Guarino
(74) *Attorney, Agent, or Firm* — DLA Piper LLP (US)

(57) ABSTRACT

A leakage detection instrument may receive an electromagnetic signal radiated from a leakage location within a cable network system. The instrument may determine the leak based on spectral analysis and without the use of tagged or test signals.

18 Claims, 7 Drawing Sheets

| OFDM FFT size | OFDM CP size | Frequency Separation fα (kHz) | Sample Rate F_s (kHz) | Decimation Factor D |
|---|---|---|---|---|
| 4096 | 192 | 47.7612 | 95.5224 | 134 |
| | 256 | 47.0588 | 94.1176 | 136 |
| | 512 | 44.4444 | 88.8889 | 144 |
| | 768 | 42.1053 | 84.2105 | 152 |
| | 1024 | 40.0000 | 80.0000 | 160 |
| 8192 | 192 | 24.4275 | 97.7099 | 131 |
| | 256 | 24.2424 | 96.9697 | 132 |
| | 512 | 23.5294 | 94.1176 | 136 |
| | 768 | 22.8571 | 91.4286 | 140 |
| | 1024 | 22.2222 | 88.8889 | 144 |

FIG. 4

METHOD AND INSTRUMENT FOR OFDM LEAKAGE DETECTION VIA CORRELATION OF OFDM PILOT SPECTRAL LINES

BRIEF DESCRIPTION OF THE FIGURES

FIG. 4 illustrates an example association between parameters of an OFDM broadband signal and other parameters used in accordance with some aspects of the embodiments of the present disclosure.

DETAILED DESCRIPTION OF SEVERAL EMBODIMENTS

Figure 1:
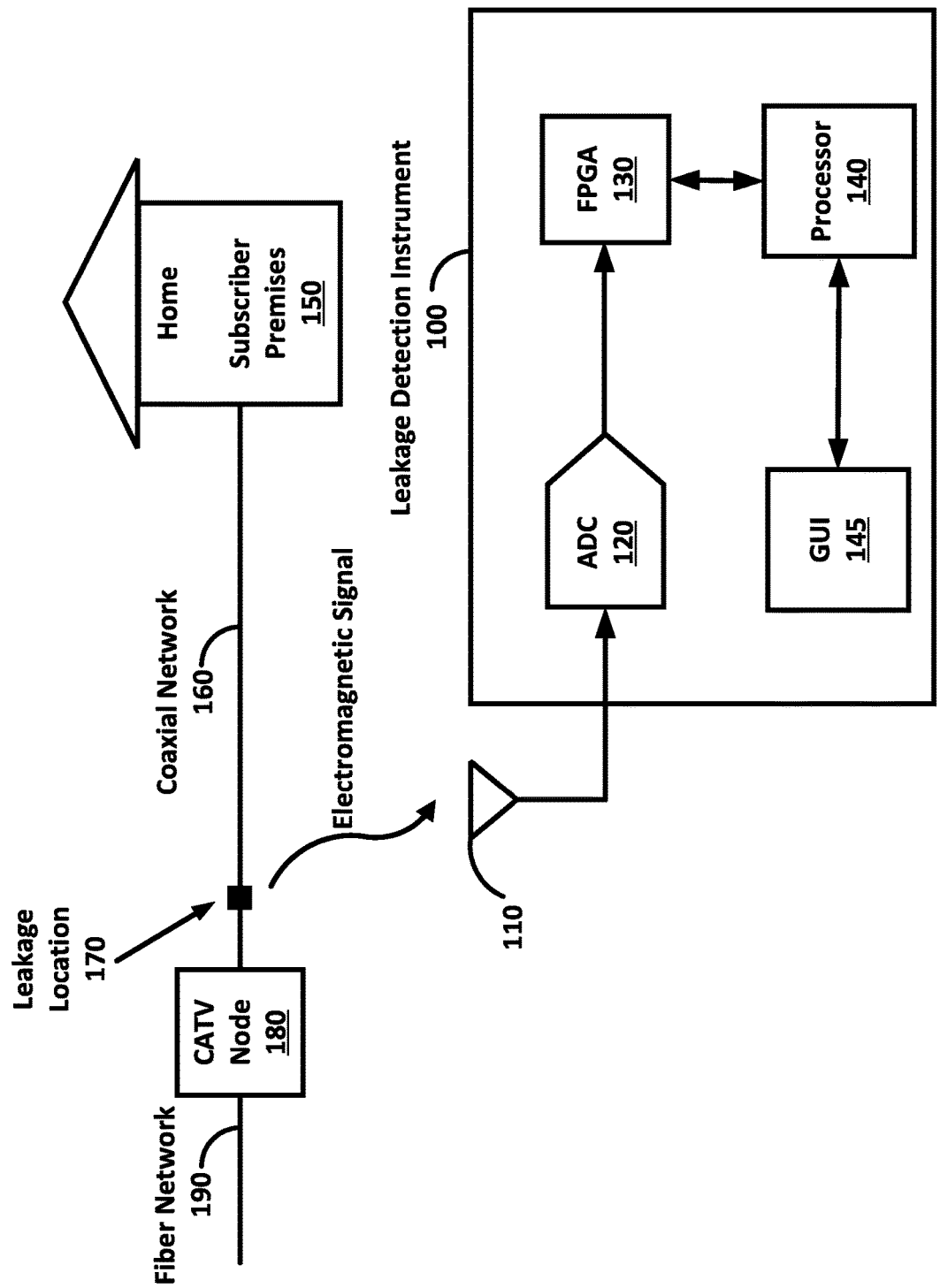
FIG. 1 illustrates an example operation of a leakage detection instrument in a cable network environment in accordance with some aspects of the embodiments of the present disclosure.

Example embodiments in this disclosure are described with respect to a broadband cable network system. While the embodiments have been described in the context of a cable network system, the general processes described herein may be used in other systems and/or networks including other systems and/or networks used for delivery of broadband content to residential or business customers without departing from the scope of the disclosed principles. The example broadband cable network system may utilize a Hybrid Fiber Coaxial (HFC) infrastructure to push content to the end users. The HFC infrastructure may combine an optical fiber portion and a coaxial cable portion with the goal to terminate the fiber as close to the end users as possible. The content transmitted via the HFC to the end users may include television channels and/or data. The television channels may be sent from the cable system's headend, that houses network operator facilities, to the end users. In addition to the television channels, the HFC infrastructure may be used for data transmission to enable Internet access. A cable modem terminating system (CMTS) may reside in the headend and may interact with cable modems (CMs) which reside in subscriber premises. Data transmission over the HFC infrastructure and communications between the CMTS and the CMs may be based on a communications standard known as the Data Over Cable Service Interface Specification (DOCSIS) developed by Cable Television Laboratories (CableLabs). Various versions of the DOCSIS standard have been released over the past few decades, with the earliest DOCSIS 1.0 released in 1997 and the most recent DOCSIS 4.0 released in 2017.

The DOCSIS standard has evolved over the years to improve data transmission speeds and quality of service for end users. The most recent DOCSIS standards (e.g., DOCSIS 3.1 and DOCSIS 4.0) employ orthogonal frequency division multiplexing (OFDM) as the basic physical layer transmission scheme in the downstream (e.g., from the CMTS to a CM) and orthogonal frequency division multiple access (OFDMA) in the upstream (e.g., from a CM to the CMTS). The use of OFDM and OFDMA may enable higher transmission speeds through higher spectral efficiency and more flexible signaling.

The upstream and downstream signals, transmitted over the HFC, occupy different portions of the radio frequency (RF) spectrum to enable duplexing and simultaneous upstream and downstream transmissions. The more recent DOCSIS standard (e.g., DOCSIS 4.0) also has a full-duplex mode of operation, wherein the upstream and downstream signals may occupy the same frequencies and may be separated using self-interference cancellation techniques. The upstream and downstream signals occupy the RF spectrum up to the 1.8 GHz frequency range, for example, according to the DOCSIS 4.0 standard. The physical layer techniques and signaling methods based on the DOCIS 3.1 and DOCSIS 4.0 standards are described in CableLabs specifications with document identifiers CM-SP-PHYv3.1 and CM-SP-PHYv4.0, respectively, which are hereby incorporated by reference.

Cable signal leakage, sometimes called egress, occurs when RF signals leak out from the cable plant and spread into the environment. Cable signal leaks may be caused by loose connectors, damaged plant cables or cracked or unterminated cables. The egress or leakage location may also be a source for ingress, when outside signals get into a coaxial cable causing a disruption in data and television channels. For example, with widespread propagation of wireless communications, such as Long Term Evolution (LTE) and the forthcoming 5G systems, the egress from a cable plant may cause deterioration to the wireless communications or the ingress into the cable plant may cause issues with data transmissions or TV channel reception quality. As can be appreciated, signal leakage detection and remediation may be of great importance for improved quality of service for end users in a cable network system or wireless users.

Existing solutions for leakage detection are typically based on the insertion of a predefined tag signal or test signal into the HFC network and the detection of the leaked tag/test signals at an egress location. Moreover, exiting leakage detection systems utilize straightforward spectrum analysis methods by computing spectrum density of a signal at a specific frequency and without considering the cyclostationary nature of the transmitted signals. The conventional spectrum analysis techniques require a high signal to noise ratio (SNR) to achieve acceptable performance. Existing solutions, therefore, lack sufficient sensitivity to detect cable signal leakage at low signal levels and/or to discriminate the leaked cable signal from noise in low SNR scenarios. Example embodiments, disclosed herein, may enhance the existing leakage detection solutions by approximately 20 dB by utilizing the spectral lines associated with pilot signals transmitted with DOCSIS OFDM signals (e.g., without the use of tag signals) which may be predicted based on DOCSIS physical layer specifications. Example embodiments may use cyclic spectral analysis to achieve enhanced performance in low SNR scenarios and may provide a 20 dB improvement over existing technology.

FIG. 1 illustrates an example operation of a leakage detection instrument 100 in a cable network environment in accordance with some aspects of the embodiments of the present disclosure. In one embodiment, the leakage detection instrument 100 may be a leakage detector from the line of Seeker™ leakage detectors manufactured and sold by VIAVI SOLUTIONS INC. The Cable TV (CATV) node 180 may be a fiber optics node that translates downstream fiber optical signals transmitted via the fiber network 190 portion of the HFC infrastructure to electrical signals for transmission over a coaxial network 160 portion of the HFC infrastructure and/or translates upstream electrical signals transmitted via the coaxial network 160 portion to fiber optical signals for transmission over the fiber network 190 portion of the HFC infrastructure. The CATV node 180 may comprise a broadband optical receiver, which may convert optically modulated signals coming from the headend or a hub to an electrical signal going to the subscriber premises 150 in a home or business. The CATV node 180 may comprise a reverse-path or return-path transmitter that may send signals from the subscriber premises 150 back to the headend (e.g., to the CMTS). The fiber optical node may feed one or more coaxial cable legs. The leakage location 170 may be at the coaxial network 160 portion of the HFC infrastructure where the modulated electrical signal may be propagated in the form of an electromagnetic signal.

The leakage detection instrument 100 may operate according to example embodiments described herein and may detect the electromagnetic signal leaked from the leakage location 170. The leakage detection instrument 100 may discriminate the leaked signal from noise even in low SNR scenarios. The leakage detection instrument 100 may detect that the received electromagnetic signal has the structure of a DOCSIS signal and hence may detect a leakage event/location. One or more embodiments may enable the discrimination of the leaked signal at low SNR levels. The leakage detection instrument 100 may receive the electromagnetic signal propagated from the leakage location 170 via one or more RF Antennas 110 mounted on the instrument 100. The received electromagnetic signal may comprise frequency components corresponding to the upstream or downstream DOCSIS signals and may be a wideband signal. The one or more RF Antennas 110 may comprise one or more dipole antennas, or one or more monopole antenna, one or more antenna arrays, etc. The one or more RF Antennas 110 may be wideband and at least designed to receive signals at frequency components corresponding to the pilot signals associated with the DOCISIS signals and/or their sideband modulation products.

The received electromagnetic signal may be converted to a baseband signal using a frequency down conversion operation by multiplying the received signal with a carrier frequency, for example using a mixer, and may be digitized using an analog to digital converter (ADC) 120. The ADC 120 may be based on standard analog to digital conversion techniques. As described in more detail below, the output of the ADC 120 may be input to a Field Programmable Gate Array (FPGA) 130 for FFT processing and then to a processor 140 for additional processing. The FPGA 130 is a digital circuit that may be programmed to implement some aspects of the disclosed embodiments, such as, FFT processing and/or decimation/down-sampling processing, etc. The processor 140 may be a microprocessor and/or a microcontroller. In some embodiments, the functions performed by the FPGA 130 and the processor 140 may be performed by a single element (e.g., by the FPGA only or by a microprocessor only). The ADC's 120 output may be down-sampled/decimated using a decimator block not shown in FIG. 1 and described in more detail below.

In one embodiment, the leakage detection instrument 100 may include a graphical user interface 145 and or other input/output device (e.g., touchscreen display, display and control buttons, to name a few) to input data, activate functions of the instrument and output information in graphical or textual form that may be used by an operator during a leakage detection process. Although not shown, the instrument 100 may include other components and circuitry such as a telemetry interface for connecting to a telemetry channel, such as a WiFi interface, Bluetooth interface, cellular interface or another network interface. In one or more embodiments, the instrument 100 may include a data storage device that may store any information used by the instrument 100 and may include memory or another type of known data storage device. The data storage device may store measured data, calculated data, tables and or other data used by the test 100 as described herein. The data storage device may include a non-transitory computer readable medium storing machine-readable instructions executable by the processor 140 to perform operations of the instrument 100 such as those described herein.

The processor 140 may include any suitable hardware to perform the operations of the instrument 100 described herein. The operations may include measuring and testing operations, determining signal parameters for upstream and downstream signals transmitted in the network and performing leakage detection as described herein. The processor 140 may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the instrument 100 described herein may be performed by the processor 140 by executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

As known in the art, an FFT is a process to determine a discrete Fourier transform (DFT) of a sequence to convert a signal from its time domain representation to the frequency domain representation. The FFT may be used to decompose a sequence of values into components of different frequencies. Various processes may be used to implement the FFT operation using hardware and/or software. In addition, example embodiments may implement the FFT processing using the FPGA 130.

Figure 2:
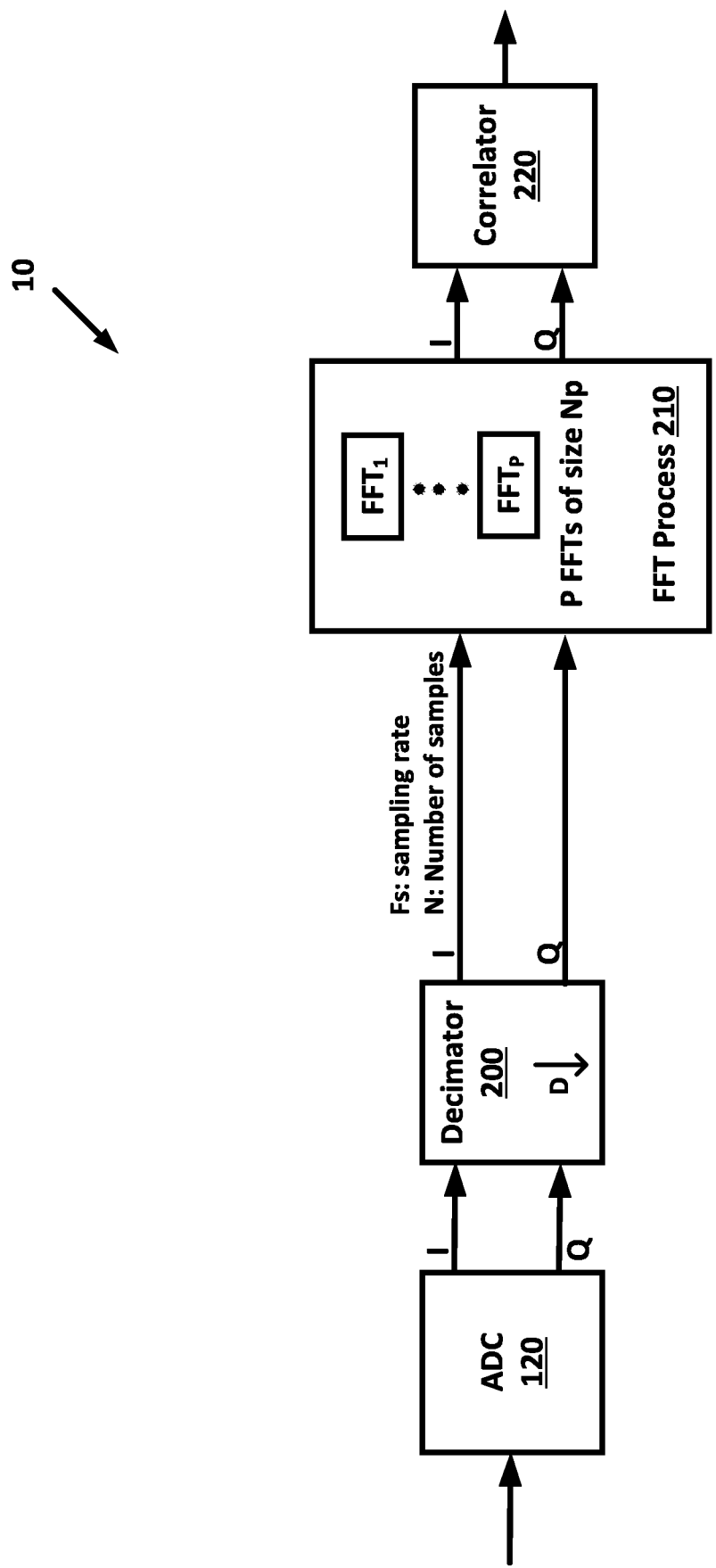
FIG. 2 illustrates an example process for orthogonal frequency division multiplexing (OFDM) leakage detection in accordance with some aspects of the embodiments of the present disclosure.

FIG. 2 illustrates an example process 10 for OFDM leakage detection in accordance with some aspects of the embodiments of the present disclosure. In one embodiment, as described in more detail below, the process 10 includes analog to digital conversion of received signals (including the leaked signal) by the ADC 120, decimation of signals (e.g., I and Q components of the signals) via a decimator 200, FFT processing via an FFT process 210 and correlations via a correlator 220. The leaked electromagnetic signal from the leakage location 170 may have been modulated by a DOCSIS OFDM signal. As described in the DOCSIS physical layer specifications, pilot subcarriers are used in a DOCSIS OFDM signal for the channel estimation (e.g., measurement of channel conditions), synchronization, and other purposes. Example pilots defined in the DOCSIS specifications include continuous pilots, scattered pilots and complementary pilots. Continuous pilots may occur at the same frequency location at every OFDM symbol and may be used for frequency and phase synchronization. Scattered pilots may not occur at the same frequency in every symbol and may be used for channel estimation. The location of the scattered pilots may change from one OFDM symbol to another. Complementary pilots may be subcarriers that carry data, but with a lower modulation order than other data subcarriers. Complementary pilots may allow phase tracking along the time axis for frequency offset and phase noise correction, and may be used by the CMTS upstream receiver to enhance signal processing, such as improving the accuracy of center frequency offset acquisition. The pilot subcarriers are specified in the DOCSIS standards and therefore their location can be predicted/predetermined as the OFDM DOCSIS signal propagated from the leakage location 170 is compliant with the DOCSIS standard. Example embodiments use this predictable structure of the DOCSIS signal for detection of a leakage event/location.

Figure 3:
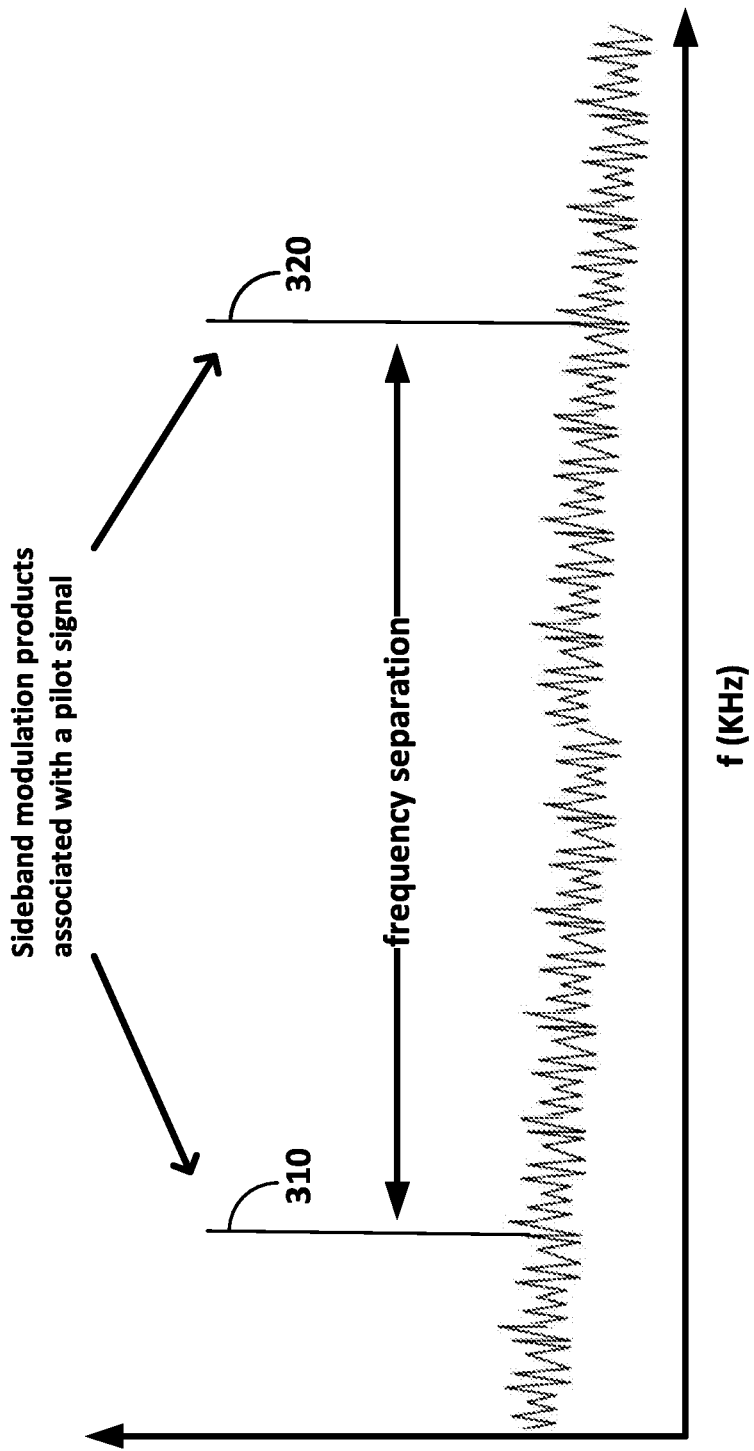
FIG. 3 illustrates a portion of an OFDM (orthogonal frequency division multiplexing) signal in a frequency domain and with frequency separation between sideband modulation products associated with a pilot subcarrier in accordance with some aspects of the embodiments of the present disclosure.

FIG. 3 shows an example of a zoomed-in DOCSIS OFDM signal at frequency components in a vicinity of a given pilot (e.g., as predicted by the DOCSIS specifications). As shown in FIG. 3, a pilot may be associated with sideband modulation products 310 and 320 due to the addition of the cyclic prefix (CP) and windowing of the OFDM symbols. The sideband modulation products 310, 320, associated with a pilot, may be referred to as spectral lines. The location of the spectral lines and frequency separation between the spectral lines may depend on parameters of the OFDM signal and may also be known/predicted based on the DOCSIS specifications. As will be described below, the location of the spectral lines associated with a pilot subcarrier and the frequency separation between the spectral lines may be based on parameters of the DOCSIS OFDM signal such as the OFDM cyclic prefix and the OFDM FFT size. In example embodiments, the leakage detection instrument 100 may implement one or more processes that utilize known/predicted spectral line locations and their frequency separation to detect the DOCSIS signal and therefore a leakage event/location. For example, a cyclic spectrum analysis process may be implemented that determines one or more correlations between frequency components that are predetermined based on the known/predicted locations of the spectral lines in the frequency domain. A high level of correlation between the predetermined frequency locations associated with the spectral lines may indicate that the received signal has the characteristics of a DOCSIS OFDM signal and therefore may indicate that a cable signal leakage event has occurred.

In example embodiments, the frequency separation (denoted as $f_\infty$) between spectral lines associated with a pilot subcarrier may be determined based on an FFT size parameter (FFTsize), indicating a size of FFT associated with the DOCSIS OFDM signal, and a cyclic prefix size (CPsize), indicating a size of cyclic prefix associated with the DOCSIS OFDM signal. In some embodiments, the association between the frequency separation $f_\infty$, FFTsize and CPsize may be derived using the following equation:

$$f_\infty = \frac{204.8 \text{ MHz}}{FFTsize + CPsize}$$

As described above, sidebands produced in the pilot carriers, referred to as spectral lines, are the result of the cyclic prefix and windowing per the DOCSIS specification. The beginning of a symbol (e.g., CP samples) is added to the ending (also called roll-off period samples) of the preceding symbol. If a phase difference exists between the CP samples and the roll-off period (RP) samples, the samples may add destructively and may create the desired windowed effect between symbols, resulting in amplitude gaps between symbols. The phase relationship may be based on the CP size (CPsize) and the frequency of the pilot carrier and may vary from pilot to pilot. For example, a 0 degree phase may result in no gaps and the pilot may behave like a fixed carrier wave (CW). A phase relationship of 180 degrees may result in a near-zero nulling of the RF envelope. The time-domain symbol is essentially a pulsed CW, which like AM modulation, may produce multiple sidebands referred to as spectral lines. A 0 degree phase may result in a single spectral component at the pilot center frequency, e.g., the pilot may behave like a fixed CW. A phase relationship of 180 degrees may result in spectral lines which are perfectly symmetrical around the center frequency.

The DOCSIS OFDM signal may utilize a plurality of pilot subcarriers. Each pilot may have different CP/RP phase relationship and thus different modulation sidebands. The locations of the spectral lines in the frequency domain may be based on the phase relationship for each pilot. The pilot frequency (e.g., denoted as fp) may be determined based on the DOCSIS specification and using the following equation where kp may be the bin index of the pilot within the OFDM signal bandwidth:

$$f_p = \frac{204.8 \text{ MHz}}{FFTsize}\left(k_p - \frac{FFTsize}{2}\right)$$

In an example, if the CP duration does not contain an integer number of periods of the pilot frequency fp, the continuous pilot CW may contain phase and amplitude modulation. The number of periods may be determined as:

$$T = CPduration * f_p =$$
$$\frac{CPsize}{204.8 \text{ MHz}} * \frac{204.8 \text{ MHz}}{FFTsize}\left(k_p - \frac{FFTsize}{2}\right) = \frac{CPsize}{FFTsize}\left(k_p - \frac{FFTsize}{2}\right)$$

and the phase relationship (denoted as Δphase) may be determined as:

$$\Delta Phase_p = \left(\frac{k_p * CPsize}{FFTsize} - FLOOR\left(\frac{k_p * CPsize}{FFTsize}\right)\right) * 360 \text{ degrees.}$$

In example embodiments, the pilot signal resulting in 180 degrees of the CP/RP phase relationship may be determined based on the above equation. The processes described in this disclosure may be for the pilot resulting in the 180 degrees phase relationship (ideal phase relationship) or for other pilots resulting in phase relationships that are not 180 degrees but for which the amplitude and frequency locations of the spectral lines may be predetermined.

FIG. 4 shows an example association between the parameters (e.g., FFTsize and CPsize) of an OFDM broadband signal and the parameters used in accordance with some aspects of the embodiments of the present disclosure. As shown in FIG. 4, each choice of FFTsize and CPsize may result in a corresponding frequency separation ($f_\infty$) between the spectral lines associated with a pilot. There may be a one-to-one association between each pair of FFTsize and CPsize and the corresponding frequency separation ($f_\alpha$). Example embodiments may utilize this one-to-one and unique relationship between the OFDM parameters and the frequency separation of the spectral line to detect a leaked DOCSIS signal with low probability of false detection. The output of the ADC 120 may have an ADC sampling rate (Fadc) which after decimation via the decimator 200 is down-sampled to a desirable sampling rate (Fs). The decimation factor (D) may be equal to Fadc/Fs. For the example illustrated in FIG. 4, the ADC sampling rate is 12.8 MHz, but it should be appreciated that the ADC sampling rate may be other values as it is based on the capabilities of the ADC 120 and the FPGA 130. The desirable frequency sampling rate (Fs) and decimation factor (D) may also be related to the frequency separation ($f_\alpha$) and the OFDM FFT size (FFTsize). In example embodiments, the sampling rate Fs may be two times the frequency separation $f_\alpha$ for an FFTsize of 4096 and may be four times the frequency separation $f_\alpha$ for an FFTsize of 8192. These choices may result in centering the spectral lines in the FFT window. The choice of parameters according to FIG. 4 may enable a high probability of detection while reducing the probability of false detection.

Referring back to the FIG. 2, in some embodiments, a decimator 200 may be used to down-sample/decimate the output of the ADC 120 to achieve a desirable sampling rate (Fs). The decimation factor D may be used by the decimator 200 as an input parameter and may be configurable. As described above, in example embodiments, the decimation factor D and the resulting sampling rate Fs may be selected based on the parameters of the DOCSIS signal such as the OFDM FFT size (FFTsize) and the OFDM cyclic prefix size (CPsize) associated with the DOCSIS OFDM signal (e.g., as shown in FIG. 4). The decimator 200 may be implemented by the FPGA 130 (FIG. 1) or may be part of the ADC 120 and/or the baseband processing.

The FFT Process 210 may process N samples from the output of the decimator 200 to generate a number (P) of FFT processed signals each having a size Np. In example embodiments, P overlapping portions of N input samples may be input to P FFT blocks to generate the P FFT processed signals. Each of the P overlapping portions may have a size of Np. The number of samples that do not overlap between two overlapping portions may be selected to be L samples (e.g., Np-L overlapping samples between two consecutive portions) and P may be related to N and L as $$P = \frac{N}{L}.$$

in example embodiments, the FFT Process 210 may be implemented by the FPGA 130. The parameters N, Np, P and L may be configurable parameters and may be selected based on system capabilities. For example, N may be chosen to be as large as possible and may be limited by the system processing time (e.g., $$\Delta t = \frac{N}{Fs}).$$

For example, Np (e.g., the FFT size) may be chosen based on the FPGA's capability. In some examples, Np may be selected to have a value of 8192. As will be described below, the parameter L may indicate an overlap between samples used for the P FFT blocks. In some examples, L may be selected as $$L = \frac{Np}{4}.$$

Figure 5:
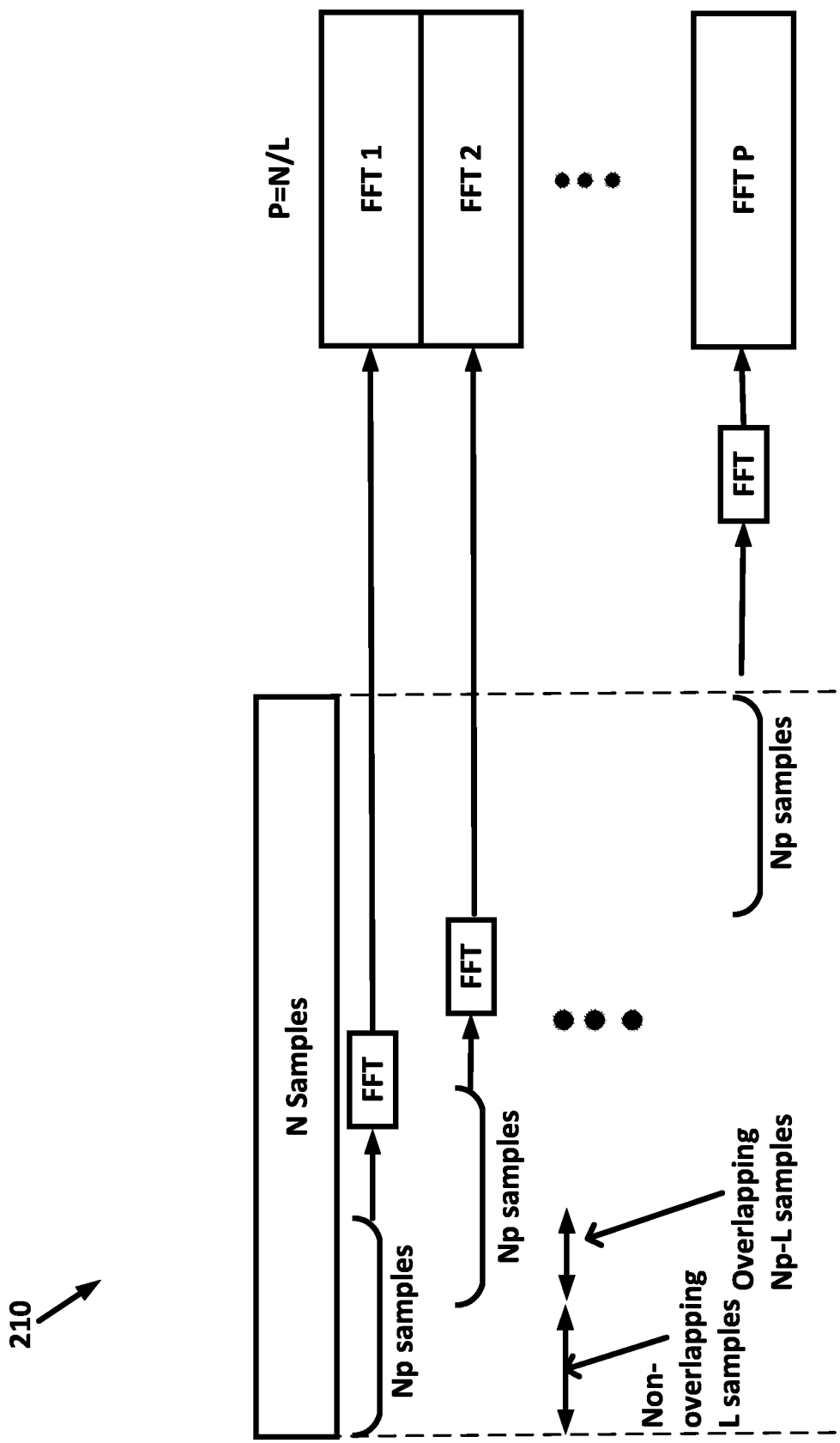
FIG. 5 illustrates example Fast Fourier Transform (FFT) processing in accordance with some aspects of the embodiments of the present disclosure.

FIG. 5 shows an example implementation of the FFT process 210. The N samples output from the decimator are divided to P overlapping sequences, each having Np samples. As shown in FIG. 5, the consecutive portions may overlap for Np-L samples and there may be no overlap for L samples. The value of the parameter L may be chosen to optimize the processes for leakage detection. In an example embodiment, the value of L may be chosen as $$L = \frac{Np}{4}.$$

Other values of L may be chosen depending on the system/network configuration. After determining the value of L, the number of the overlapping sequences (P) may be derived from the number of samples (N) and L as $$L = \frac{N}{P}.$$

The output of the FFT process 210 may be a table with P rows (corresponding to the P FFTs) and Np columns (corresponding to the FFT size). Each column of the table represents a frequency bin and each row represents how the spectral density associated with the frequency bin varies over time. Therefore, the table output of the FFT process 210 may be used to determine how frequency characteristics of the input signal evolve over time.

Referring back to FIG. 2, the correlator 220 may implement detection of the leaked OFDM DOCSIS signal based on determining a correlation between spectral lines associated with a pilot subcarrier. As will be describe in more detail, the correlator 220 may use the P FFT processed signals and may implement a cyclic spectrum analysis technique to determine one or more correlation values. In example embodiments, the correlator 220 may be implemented using the processor 140 (FIG. 1).

Example embodiments may utilize cyclic spectrum analysis to determine one or more correlation values between spectral components associated with spectral lines corresponding to a pilot subcarrier. Traditional spectrum analysis may comprise computing the power spectrum density of a signal which is based on a one-dimensional Fourier Transform of the signal. Manmade signals encountered in communication systems may be cyclostationary and may have probabilistic parameters that vary periodically with time. A cyclic spectrum analysis may result in a two-dimensional spectrum, which may estimate the correlation between spectral components of a signal. The cyclic spectrum analysis may perform well in low SNR scenarios and may have comparatively better signal discrimination capabilities in highly corrupted environments.

A spectrum correlation function may be a two dimensional function defined by a frequency component (fo) and a cyclic frequency coordinate (αo), wherein fo is the center frequency between a channel pair and αo is the spacing between the channel pair. The spectral correlation function (SCF) may be the expected value, over time, of product of a channel pair of spectral components based on the following equation:

$$SCF(\alpha, f) = \langle X(t, f + \tfrac{\alpha}{2}) X^*(t, f - \tfrac{\alpha}{2}) \rangle_T$$

wherein the operation $\langle A \rangle_T$ indicates the expected value of A.

Figure 6:
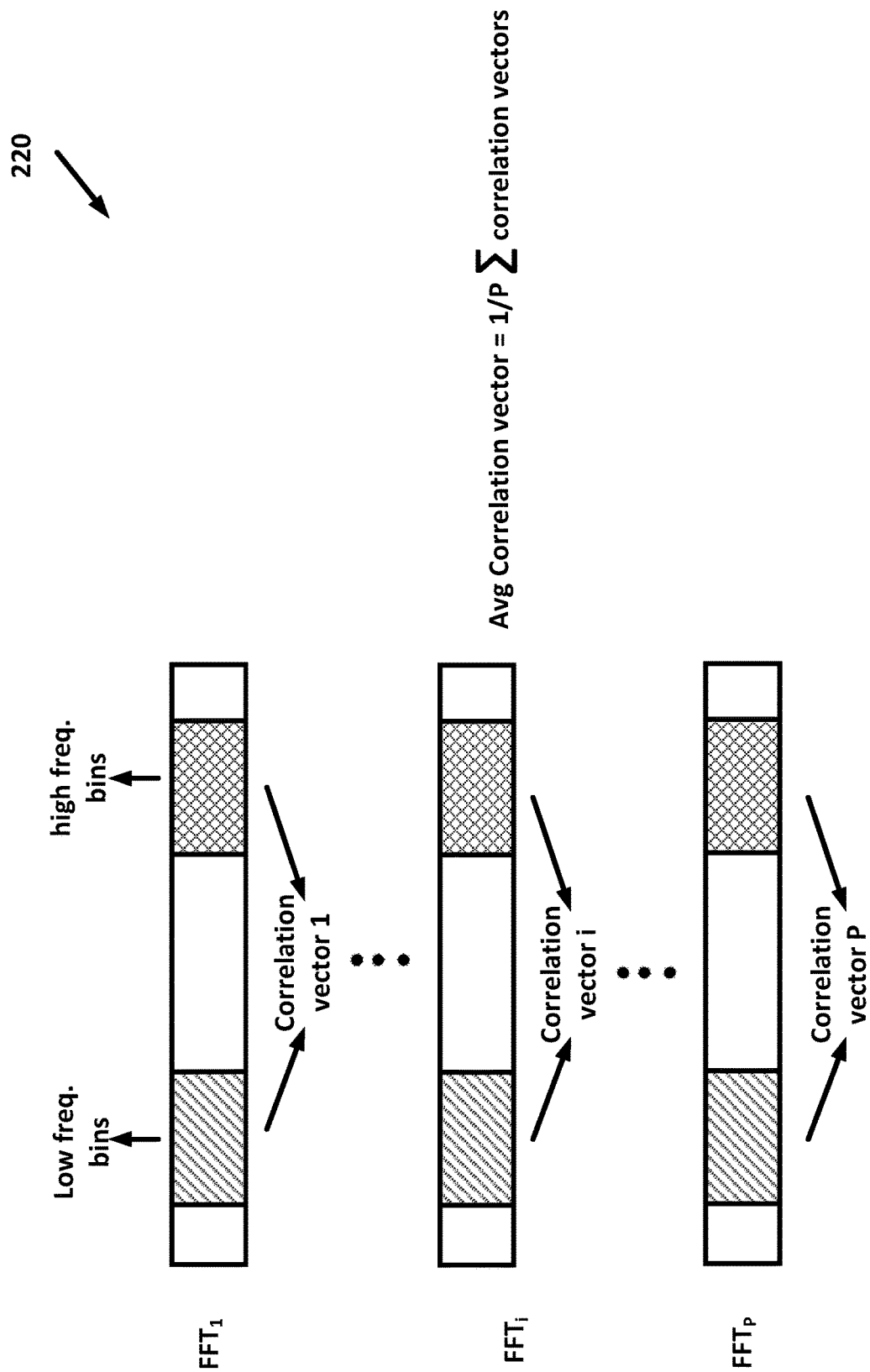
FIG. 6 illustrates an example process for obtaining one or more correlation values in accordance with some aspects of the embodiments of the present disclosure.

FIG. 6 shows an example implementation of the correlator 220. The correlator 220 may be based on determining a spectral correlation function (SCF) described above. The SCF may estimate the correlation between spectral components of the signal. Each sample in the SCF may be determined from a channel pair (e.g., two bins of the FFT of the signal) and may be defined by two coordinates, fo and αo (e.g., SCF (fo, αo)), wherein fo is the center frequency between the channel pair and αo is the spacing between the channel pair. To detect the leaked DOSCIS OFDM signal, the pre-determined frequency separation between the spectral lines, an example of which is shown in FIG. 4, may be used. The center frequency fo may be zero with no frequency tuning error and/or with the receiver being tuned to the nominal pilot frequency. To allow operation in scenarios with frequency tuning errors, center frequency (fo) values of plus or minus the maximum frequency tuning error may be used. For example, the low frequency bins and high frequency bins for each of the P FFT outputs may contain multiple channel pairs consisting of fixed αo and swept fo by number of frequency bins (e.g., denoted as S) based on the maximum frequency tuning error. With an amount of sweep equal to S, the maximum allowable tuning error may be $$\frac{Fs}{Np} \times S.$$

In some example embodiments, S may be selected as $$S = \frac{Np}{4}.$$

For example, with an 8K FFT and with sampling rate of 88.89 KHz and S=2048, the allowable tuning frequency error may be 22.2 KHz.

In an example embodiment, each of the P FFT outputs of the FFT process 210, may be used to determine a correlation vector of size S. The determining of the correlation vector may be based on complex multiplication of the low frequency bins and high frequency bins. The P correlation vectors may result in an SCF table. The correlation values corresponding to each column may be averaged to find an average value. The average values, corresponding to different columns, may result in an average correlation vector. The average correlation vector may be used by a processor to determine whether the received signal by the leakage detection instrument 100 is a DOCSIS OFDM signal and is therefore associated with a leaked signal.

In example embodiments, one or more leakage detection parameters may be input to the leakage detection instrument 100 using the graphical user interface (GUI) 145. The one or more leakage detection parameters may include an FFTsize parameter which may take one of a plurality of values (e.g., 4096 or 8192 per DOCSIS specification), a CPsize parameter which may take one of a plurality of values (e.g., 192, 256, 512, 768, or 1024 per DOCSIS specification), a PLCStartFreq parameter indicating a frequency of the lowest Physical Layer Link Channel (PLC) subcarrier of the OFDM channel, a PLCStartBinIndex parameter indicating a bin index of the lowest PLC subcarrier of the OFDM channel. In example embodiments, an optimum pilot from the available pilots may be selected, for example to achieve a CP/RP phase relationship of 180 degrees. The input parameters may also be used to determine the frequency separation, the number of high and low frequency bins for each FFT based on the maximum frequency tuning error, etc.

Figure 7:
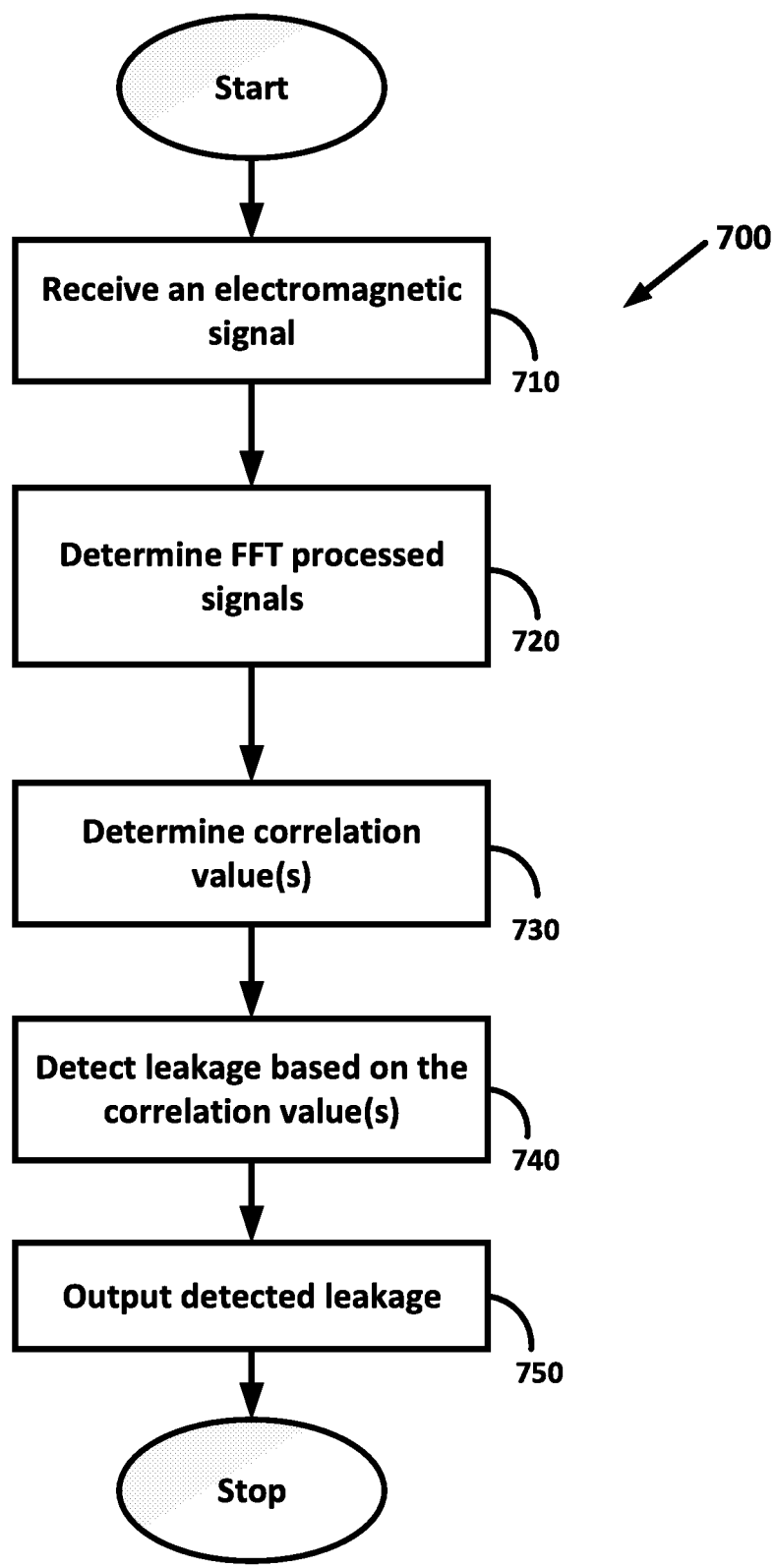
FIG. 7 illustrates an example OFDM leakage detection process in accordance of with some aspects of the embodiments of the present disclosure.

FIG. 7 shows an example OFDM leakage detection process 700 using the leakage detection instrument 100 in accordance of with some aspects of the embodiments of the present disclosure. At step 710, the instrument 100 may receive an electromagnetic signal. The electromagnetic signal may be radiated from a leakage location in the cable network system. According to an embodiment, receiving the electromagnetic signal may be via one or more antennas 110 mounted on the instrument 100. As noted above, the electromagnetic signal may have been modulated by a broadband signal. At step 720, the instrument 100 may determine a plurality of Fast Fourier Transform (FFT) processed signals associated with overlapping portions of a baseband signal corresponding to the received electromagnetic signal. According to an embodiment, the instrument 100 may determine the baseband signal based on an analog to digital conversion processing of the received broadband signal. According to an embodiment, the analog to digital converted signal may be decimated signal with a predetermined sampling rate. The predetermined sampling rate may be based on a frequency separation between sideband modulation products associated with a pilot signal.

At step 730, the instrument 100 may determine, based on the plurality of the FFT processed signals and using a cyclic spectrum analysis, one or more correlation values between predetermined frequency components. According to an embodiment, determining the one or more correlation values may comprises: determining a plurality of correlation vectors between low-frequency bins and high-frequency bins of each of the plurality of FFT processes signals, wherein the low-frequency bins and high-frequency bins each comprise a first number of bins; and determining average correlation vector of the plurality of correlation vectors. According to an embodiment, the predetermined frequency components may comprise spectral components of sideband modulation products associated with a pilot signal.

According to an embodiment, the instrument 100 may determine a frequency separation of the sideband modulation products, wherein determining the frequency separation may be based on parameters of the broadband signal (e.g., an OFDM FFT size and a cyclic prefix size associated with the broadband signal). The instrument 100 may determine the predetermined frequency components based on the frequency separation. According to an embodiment, the instrument 100 may determine the pilot signal, in a plurality of pilot signals, based on a phase difference between cyclic prefix samples and roll-off period samples associated with the pilot signal. The phase difference may be 180 degrees or values close to 180 degrees.

At step 740, the cable network leakage detection instrument 100 may detect a leakage event based on the one or more correlation values as discussed in more detail above. At step 750, the instrument 100 may generate and output (via the GUI 145) an indication of the detected leakage. The output may include a plot of the signals, a spectral graph, or other output that may alert the operator of the detected leakage.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method comprising:
    receiving, by a leakage detection instrument, an electromagnetic signal radiated from a leakage location in a cable network system;
    determining, using a spectrum analysis process on the received electromagnetic signal, one or more correlation values between predetermined frequency components associated with a pilot subcarrier of a broadband orthogonal frequency division multiplexing (OFDM) signal transmitted within the system; and
    detecting a leakage event based on the one or more correlation values,
    wherein the predetermined frequency components comprise spectral components of sideband modulation products associated with the pilot subcarrier.

2. The method of claim 1, wherein the determining step further comprises:
    determining a plurality of Fast Fourier Transform (FFT) processed signals associated with overlapping portions of a baseband OFDM signal corresponding to the received electromagnetic signal; and
    determining the one or more correlation values based on the plurality of FFT processed signals and a cyclic spectrum analysis process.

3. The method of claim 2, wherein the determining the one or more correlation values comprises:
    determining a plurality of correlation vectors between low-frequency bins and high-frequency bins of each of the plurality of FFT processed signals, wherein the low-frequency bins and high-frequency bins each comprise a first number of bins; and
    determining average correlation vector of the plurality of correlation vectors.

4. The method of claim 2, further comprising:
    determining a frequency separation of the sideband modulation products; and
    determining the predetermined frequency components based on the frequency separation.

5. The method of claim 4, wherein determining the frequency separation is based on parameters of the baseband OFDM signal, said parameters comprising an OFDM FFT size and a cyclic prefix size associated with the broadband OFDM signal.

6. The method of claim 4, further comprising determining the pilot subcarrier, in a plurality of pilot subcarriers, based on a phase difference between cyclic prefix samples and roll-off period samples associated with the pilot subcarrier.

7. The method of claim 4, further comprising determining the baseband OFDM signal based on an analog to digital conversion processing of the received electromagnetic signal.

8. The method of claim 7, wherein determining the baseband OFDM signal further comprises decimating the analog to digital converted signal to a decimated signal with a predetermined sampling rate.

9. The method of claim 8, wherein the predetermined sampling rate is based on the frequency separation between sideband modulation products associated with the pilot subcarrier.

10. A leakage detection instrument comprising:
    circuitry configured to:
        receive an electromagnetic signal radiated from a leakage location in a cable network system;
        determine, using a spectrum analysis process on the received electromagnetic signal, one or more correlation values between predetermined frequency components associated with a pilot subcarrier of a broadband orthogonal frequency division multiplexing (OFDM) signal transmitted within the system; and
        detect a leakage event based on the one or more correlation values,
        wherein the predetermined frequency components comprise spectral components of sideband modulation products associated with the pilot subcarrier.

11. The leakage detection instrument of claim 10, wherein the circuitry is configured to determine the one or more correlation values by:
    determining a plurality of Fast Fourier Transform (FFT) processed signals associated with overlapping portions of a baseband OFDM signal corresponding to the received electromagnetic signal; and
    determining the one or more correlation values based on the plurality of FFT processed signals and a cyclic spectrum analysis process.

12. The leakage detection instrument of claim 11, further comprising:
    determining a plurality of correlation vectors between low-frequency bins and high-frequency bins of each of the plurality of FFT processed signals, wherein the low-frequency bins and high-frequency bins each comprise a first number of bins; and
    determining average correlation vector of the plurality of correlation vectors.

13. The leakage detection instrument of claim 11, wherein said circuitry is further configured to:
   determine a frequency separation of the sideband modulation products; and
   determine the predetermined frequency components based on the frequency separation.

14. The leakage detection instrument of claim 13, wherein determining the frequency separation is based on parameters of the baseband OFDM signal, said parameters comprising an OFDM FFT size and a cyclic prefix size associated with the broadband OFDM signal.

15. The leakage detection instrument of claim 13, wherein the circuitry is configured to determine the pilot subcarrier, in a plurality of pilot subcarriers, based on a phase difference between cyclic prefix samples and roll-off period samples associated with the pilot sub carrier.

16. The leakage detection instrument of claim 13, wherein the circuitry is further configured to determine the baseband OFDM signal based on an analog to digital conversion processing of the received electromagnetic signal.

17. The leakage detection instrument of claim 16, wherein determining the baseband OFDM signal further comprises decimating the analog to digital converted signal to a decimated signal with a predetermined sampling rate.

18. The leakage detection instrument of claim 17, wherein the predetermined sampling rate is based on the frequency separation between sideband modulation products associated with the pilot subcarrier.

* * * * *